United States Patent
Shekleton

Patent Number: 5,231,822
Date of Patent: Aug. 3, 1993

[54] HIGH ALTITUDE TURBINE ENGINE STARTING SYSTEM

[75] Inventor: Jack R. Shekleton, San Diego, Calif.
[73] Assignee: Sundstrand Corporation, Rockford, Ill.
[21] Appl. No.: 699,514
[22] Filed: May 14, 1991
[51] Int. Cl.⁵ .......................... F23R 3/02; F02C 6/06
[52] U.S. Cl. ................................ 60/39.141; 60/39.36
[58] Field of Search ............... 60/39.36, 760, 39.141, 60/39.142, 39.06, 39.07

[56] References Cited

U.S. PATENT DOCUMENTS

| | | | |
|---|---|---|---|
| 2,797,562 | 10/1956 | Hall | 60/39.07 |
| 3,098,626 | 7/1963 | Messinger . | |
| 3,905,191 | 9/1975 | Matto | 60/39.07 |
| 4,747,262 | 5/1988 | Maynard . | |
| 4,785,624 | 11/1988 | Smith et al. | 60/39.75 |
| 4,838,020 | 6/1989 | Fujitsuka | 60/39.07 |
| 5,103,629 | 4/1992 | Mumford et al. | 60/39.06 |

Primary Examiner—Richard A. Bertsch
Assistant Examiner—Timothy S. Thorpe
Attorney, Agent, or Firm—Wood, Phillips, VanSanten, Hoffman & Ertel

[57] ABSTRACT

In order to enhance starting and flame propagation at a high altitudes, particularly in small turbine engines such as auxiliary power units and the like, the turbine engine (10) includes a rotor (12), turbine blades (16) a turbine nozzle (20), an annular combustor (22), a fuel injector (40), and a compressed air bleed system (44). The annular combustor (22) is disposed about the rotor (12) and has spaced inner and outer walls (28 and 30) interconnected by a generally radially extending wall (32). A housing (34) substantially surrounds the annular combustor (22) to define an air flow path (36) including a compressed air inlet (38) in communication with a source of compressed air at one end thereof wherein the air flow path (36) extends from the compressed air inlet (38) at least part-way about the annular combustor (22). The fuel injector (40) includes a control system (42) integrally associated therewith for injecting fuel at an optimum flow rate and pressure directly responsive to instantaneous operating conditions. The compressed air bleed system (44) bleeds compressed air from the air flow path (36) in a substantially uniform manner for use at a remote location. With this arrangement, the turbine engine (10) is such that the compressed air bleed system (44) includes a valve (46) integrally associated therewith for bleeding compressed air at a variable rate directly responsive to instantaneous operation conditions, i.e., the valve (46) is substantially open for high altitude, low speed starting conditions during ignition, is entirely closed for high altitude, starting conditions after ignition, and is open during normal high altitude, full speed conditions when bleed air is required.

18 Claims, 1 Drawing Sheet

HIGH ALTITUDE TURBINE ENGINE STARTING SYSTEM

FIELD OF THE INVENTION

The present invention is directed to a turbine engine and, more particularly, a high altitude starting system for a turbine engine.

BACKGROUND OF THE INVENTION

In many cases, small auxiliary power unit gas turbines are required to start at very high altitudes, e.g., on the order of 40,000 feet or more. It is known that large main propulsion gas turbines cannot start at such high altitudes and, therefore, this requirement for small auxiliary power unit gas turbines is most demanding, particularly since it is generally accepted that combustion is very difficult at best at such altitudes and even more so in small scale applications. Furthermore, small auxiliary power unit gas turbines cannot afford the sophisticated fuel injector and combustor designs customary in large main propulsion turbines.

Generally speaking, the controlling elements for combustion are adequate fuel atomization, adequate volume for mixing, and adequate volume for reaction. It is also known that the time available for fuel evaporation is proportionate to the fuel droplet size which means that, with a small scale combustor, it is important to have a proportionate improvement, i.e., reduction, in the fuel droplet size. However, with combustor scale reductions, the fuel atomization is typically worsened primarily because of enhanced viscous small scale effects which are commonly experienced.

In recent years, there have been a number of improvements for providing a considerable reduction in fuel droplet size. For instance, for a given fuel pressure, impingement fuel pressure atomization provides a marked improvement in fuel droplet size over the commonly used swirl pressure atomizing fuel injectors. By also reducing the number of fuel metering orifices, it is possible to attain improved reliability, lowered cost, and improved ignition.

As for mixing and reaction, it is known that the air and fuel should be uniformly mixed upon entering the combustor. Further, it is known that adequate volume must be available to complete reaction and, since size and pressure are inversely related, the larger the combustor scale, the lower the pressure at which combustion can be achieved. As a result, it is known that larger engines should ordinarily have a higher altitude capability than small engines.

In order to overcome the problems associated with smaller combustors, it has been necessary to provide advanced techniques for high altitude starting of auxiliary power units. It has, thus, been a goal to be able to provide a turbine engine, particularly a small auxiliary power unit, which is fully capable of very high altitude starts but with simple, inexpensive design characteristics. In furtherance of the objective of achieving this goal, the present invention is directed to a high altitude turbine engine starting system having truly unique characteristics

SUMMARY OF THE INVENTION

It is a principal object of the present invention to provide a new and improved turbine engine. It is a further object of the present invention to provide a turbine engine having an enhanced starting capability but with a simple, inexpensive design suitable for an auxiliary power unit or the like. It is another object of the present invention to provide a high altitude turbine engine starting system.

Accordingly, the present invention is directed to a turbine engine having a rotor including turbine blades and a nozzle adjacent the turbine blades. The nozzle is adapted to direct hot gases of combustion at the turbine blades to cause rotation of the rotor. The turbine engine also includes an annular combustor about the rotor having an outlet to the nozzle. The annular combustor has spaced inner and outer walls which are interconnected by a generally radially extending wall. With this arrangement, the turbine engine has a combustion annulus defined by the inner, outer and radially extending walls upstream of the outlet.

Further, the turbine engine includes a housing substantially surrounding the annular combustor in spaced relation to the inner, outer and radially extending walls thereof. The housing defines an air flow path including a compressed air inlet in communication with a source of compressed air at one end thereof. As for the air flow path defined by the housing, it extends from the compressed air inlet at least part-way and preferably substantially entirely about the annular combustor.

In accordance with the invention, the turbine engine includes means for injecting fuel from a source into the combustion annulus. The fuel injecting means has control means integrally associated therewith for injecting fuel at an optimum flow rate and pressure. Further, the control means is directly responsive to the instantaneous operating conditions.

Still additionally, the turbine engine includes means for bleeding compressed air from the air flow path in a substantially uniform manner. The compressed air bleeding means includes valve means integrally associated therewith for bleeding compressed air at a variable rate. In order to achieve high altitude starting, the valve means is directly responsive to the instantaneous operating conditions.

In a highly preferred embodiment, a controller is operatively associated with the valve means for adjusting the valve means responsive to the instantaneous operating conditions. The controller advantageously includes means for substantially opening the valve means in high altitude, low speed starting conditions during ignition, means for entirely closing the valve means in high altitude, starting conditions after ignition, and means for opening the valve means during normal high altitude, full speed conditions when bleed air is required for a variety of useful purposes. Preferably, the compressed air bleeding means includes a duct leading from a bleed manifold and the valve means is integrally associated with the duct downstream of the bleed manifold.

In another respect, the present invention is directed to a unique method of operating a turbine engine of the type described hereinabove. The method includes the steps of injecting fuel from a source into an annular combustor at an optimum flow rate and pressure directly responsive to the instantaneous operating conditions and bleeding compressed air from the air flow path in a substantially uniform manner at a variable rate directly responsive to the instantaneous operating conditions. In a preferred implementation of the method, the bleeding step includes bleeding compressed air from the air flow path at a location remote from the nozzle.

When the method is utilized to operate a radial turbine engine, the compressed air is bled from the air flow path through a plurality of uniformly circumferentially spaced holes in the housing. The compressed air bled from the air flow path is so removed for purposes of being delivered to a remote location. Still more specifically, the compressed air is bled at the variable rate by controlling the rate of bleeding directly responsive to the instantaneous operating conditions.

In concert with the description of the turbine engine of the present invention, the method is such that the bleeding step includes substantially bleeding compressed air in high altitude, low speed starting conditions during ignition, entirely eliminating bleeding in high altitude, starting conditions after ignition, and maximizing bleeding during normal high altitude, high speed conditions when required for a variety of useful purposes.

Other objects, advantages and features of the present invention will become apparent from a consideration of the following specification taken in conjunction with the accompanying drawings.

DETAILED DESCRIPTION OF THE PREFERRED EMBODIMENT

Figure 1:
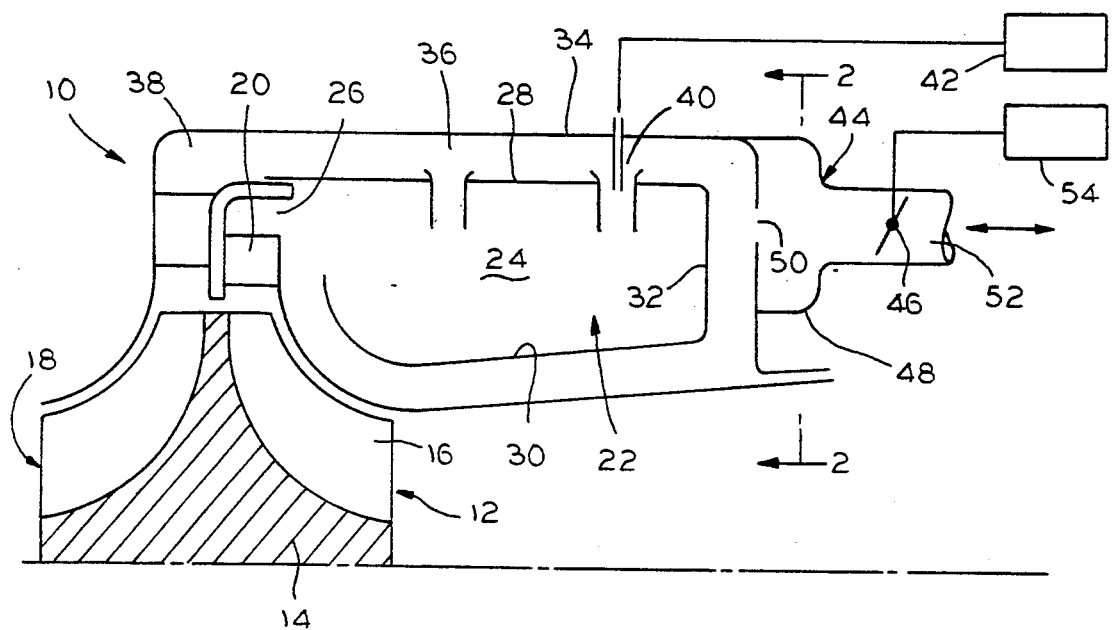
FIG. 1 is a largely schematic cross sectional view of a high altitude turbine engine starting system in accordance with the present invention.

In the illustrations given, and with reference first to FIG. 1, the reference numeral 10 designates generally a turbine engine employing a starting system in accordance with the present invention. The turbine engine 10 includes a turbine wheel generally designated 12 comprised of a rotor 14 and turbine blades 16 wherein the turbine wheel 12 is coupled to a rotary compressor generally designated 18 for axially driven movement thereof in the radial turbine engine as illustrated. Still referring to FIG. 1, the turbine engine 10 includes an annular nozzle 20 adjacent the turbine blades 16 for directing hot gases of combustion at the turbine blades 16 to cause rotation of the rotor 14.

As shown, the turbine engine 10 also includes an annular combustor 22 defining an annular combustion space 24 which is disposed about the turbine wheel 12 and is also in fluid communication with both the compressor 18 and the nozzle 20. The annular combustor 22 leads to an outlet 26 in communication with the nozzle 20, and it is adapted to receive fuel from a source (not shown) and air from the compressor 18 whereby the fuel and air may then be combusted in the combustion space 24 to generate the gases of combustion. With this understanding, the annular combustor 22 is defined by an annular outer wall 28, an annular inner wall 30, and a radially extending wall 32 extending between the outer and inner walls 28 and 30 axially opposite the nozzle 20.

As will be appreciated, the outer and inner walls 28 and 30 are essentially disposed in radially spaced apart relation. It will also be appreciated that the annular combustion space or combustion annulus 24 is positioned upstream of the outlet 26. In other words, the gases of combustion flow axially in a direction generally from the radial wall 32 toward the outlet 26.

Still referring to FIG. 1, the turbine engine 10 includes a housing 34 substantially surrounding the annular combustor 22 in spaced relation to the outer, inner and radially extending walls 28, 30 and 32 thereof. The housing 34 defines an air flow path 36 which includes a compressed air inlet as at 38 in communication with the compressor 18 at one end thereof. Additionally, the air flow path 36 extends from the compressed air inlet 38 at least part-way, and preferably substantially entirely, about the outer, inner and radially extending walls 28, 30 and 32, respectively.

In addition to the foregoing, the turbine engine 10 includes fuel injecting means 40 for injecting fuel from a source (not shown) into the annular combustor 22. The fuel injecting means 40, which may take various forms but may advantageously utilize impingement fuel pressure atomization principles, will also be seen to include control means 42, which may be a computerized system of a suitable type that will be known and appreciated by those skilled in the art, and the control means 42 is integrally associated with the fuel injecting means 40 for injecting fuel at an optimum flow rate and pressure. In this connection, the computerized control means 42 will be of a conventional type that is directly responsive to the instantaneous operating conditions.

Since this is all well within the capability of those skilled in the art, it need not be described in detail herein.

In accordance with the invention, the turbine engine 10 further includes compressed air bleeding means generally designated 44. The compressed air bleeding means 44 is adapted to bleed compressed air from the air flow path 36 in a substantially uniform manner, and it will be seen to include valve means 46 integrally associated therewith for bleeding compressed air at a selectively variable rate. More specifically, the valve means 46 is advantageously directly responsive to the instantaneous operating conditions.

Figure 2:
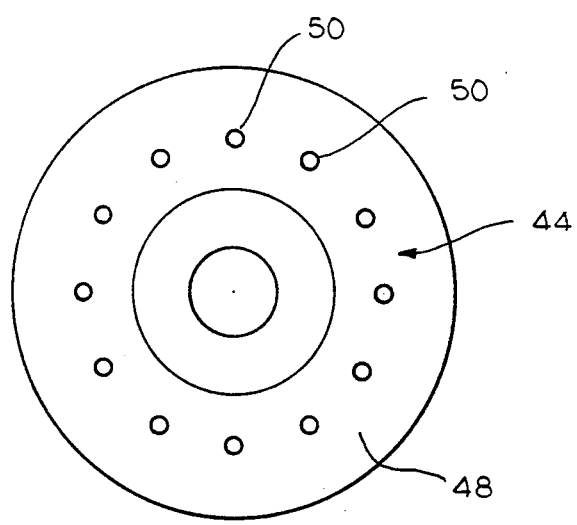
FIG. 2 is a cross sectional view taken on the line 2—2 of FIG. 1 and illustrating a bleed manifold arrangement for bleeding compressed air in a substantially uniform manner.

Referring to both of FIGS. 1 and 2, the compressed air bleeding means 44 will be seen to comprise a bleed manifold 48 in fluid communication with the air flow path 36 through the housing 34. The bleed manifold 48 is in fluid communication with the air flow path 36 at a point directly opposite the radially extending wall 32, i.e., at a point axially remote from the nozzle 20. As best shown in FIG. 2, the bleed manifold 48 will be seen to be in direct fluid communication with the air flow path 36 through a plurality of uniformly circumferentially spaced holes 50 in the housing 34.

Referring once again to FIG. 1, the compressed air bleeding means 44 will also be seen to include a compressed air duct 52. This duct 52 is adapted to deliver compressed air from the rotary compressor 18 to a remote location for use in an associated system or the like. For adjusting the valve means 46 responsive to the instantaneous operating conditions, a controller 54 is operatively associated therewith.

As shown in FIG. 1, the valve means 46 is integrally associated with the duct 52 at a point located downstream of the bleed manifold 48 for bleeding compressed air at a variable rate. It will also be appreciated that, in accordance with the present invention, the controller 54 includes means for substantially opening the valve means 46 in high altitude, low speed starting conditions during ignition, means for entirely closing the valve means 46 in high altitude, starting conditions after ignition, and means for opening the valve means 46 during normal high altitude, full speed conditions when bleed air is required for a variety of useful purposes. In this connection, the means for closing and opening the valve means 46 will suitably comprise a computerized valve actuating device of a type known to those skilled in the art.

In another respect, the present invention is directed to a unique method of operating a turbine engine of the type described. The method includes the steps of injecting fuel from a source into an annular combustor at an optimum flow rate and pressure directly responsive to the instantaneous operating conditions and bleeding compressed air from the air flow path in a substantially uniform manner at a variable rate directly responsive to the instantaneous operating conditions. In a preferred implementation of the method, the bleeding step includes bleeding compressed air from the air flow path at a location remote from the nozzle.

When the method is utilized to operate a radial turbine engine, the compressed air is bled from the air flow path at a point axially remote from the nozzle through a plurality of uniformly circumferentially spaced holes in the housing. More specifically, the compressed air bled from the air flow path is so removed for purposes of being delivered to a remote location, and it is bled at a variable rate by controlling the rate of bleeding directly responsive to the instantaneous operating conditions.

In concert with the description of the turbine engine of the present invention, the method is such that the bleeding step includes substantially bleeding at high altitude, low speed starting conditions during ignition, entirely eliminating bleeding in high altitude, starting conditions after ignition, and maximizing bleeding during normal high altitude, high speed conditions when bleed air is required for a variety of useful purposes.

With the foregoing understanding of the present invention, several points are worthy of mention. First, the holes 50 are arranged circumferentially about the housing 34 to bleed air in a desirably uniform manner about the circumference of the turbine engine 10. This is done by bleeding air from the air flow path 36 in such a manner that there is a low pressure loss while the circumferential uniformity of draw-off of air results in minimizing any hot spots at the nozzle 20. Second, the substantial opening of the valve means 46 in high altitude, low speed starting conditions during ignition is advantageous to maximize ignition reliability. Third, the substantial closing of the valve means 46 in high altitude starting conditions after ignition is advantageous to maximize the engine torque for enhanced acceleration. The substantial elimination of bleeding air after ignition means that the valve means 46 is ordinarily closed during starting except it may be modulated slightly open so as to avoid engine surge. Fourth, the engine is ordinarily ignited at the lowest possible speed. At low engine speeds, the ignition reliability is measurably improved because bleeding lowers the air velocities inside the combustor.

While in the foregoing there has been described a preferred embodiment of the invention, it will be appreciated that the details herein given may be varied by those skilled in the art without departing from the true spirit and scope of the appended claims.

I claim:
1. A turbine engine, comprising:
- a rotor including turbine blades and a nozzle adjacent said turbine blades, said nozzle being adapted to direct hot gases of combustion at said turbine blades to cause rotation of said rotor;
- an annular combustor about said rotor and having an outlet to said nozzle, said annular combustor having spaced inner and outer walls interconnected by a generally radially extending walls, said annular combustor also including a combustion annulus defined by said inner, outer and radially extending walls upstream of said outlet;
- a housing substantially surrounding said annular combustor in spaced relation to said inner, outer and radially extending walls thereof, said housing defining an air flow path including a compressed air inlet in communication with a source of compressed air at one end thereof, said air flow path extending from said compressed air inlet at least part way about said annular combustor;
- means for injecting fuel from a source into said combustion annulus, said fuel injecting means including control means integrally associated therewith for injecting fuel at an optimum flow rate and pressure, said control means being directly responsive to instantaneous operating conditions; and
- means for bleeding compressed air from said air flow path in a substantially uniform manner, said compressed air bleeding means including valve means integrally associated therewith for bleeding compressed air at a variable rate from an intermediate point along said air flow path, said valve means being directly responsive to instantaneous operating conditions.

2. The turbine engine of claim 1 wherein said compressed air bleeding means comprises a bleed manifold in fluid communication with said air flow path through said housing.

3. The turbine engine of claim 2 wherein said bleed manifold is in fluid communication with said air flow path through said housing directly opposite said radially extending wall.

4. The turbine engine of claim 2 wherein said bleed manifold is in fluid communication with said air flow path through a plurality of uniformly spaced holes in said housing.

5. The turbine engine of claim 2 wherein said compressed air bleeding means includes a duct leading from said bleed manifold for delivering compressed air to a remote location.

6. The turbine engine of claim 5 wherein said valve means is integrally associated with said duct downstream of said bleed manifold for bleeding compressed air at a variable rate.

7. A radial turbine engine, comprising:
- a turbine wheel coupled to a rotary compressor for axially driven movement thereof;
- an annular nozzle for directing gases of combustion radially at said turbine wheel;
- an annular combustor defining an annular combustion space disposed about said turbine wheel and in fluid communication with both said compressor and said nozzle, said annular combustor receiving fuel from a source and air from said compressor and combusting fuel and air in said combustion space to generate said gases of combustion, said annular combustor being defined by an annular outer wall, an inner wall, and a radial wall extending between said inner and outer walls axially opposite said nozzle;

a housing substantially surrounding said annular combustor in spaced relation to said inner, outer and radially extending walls thereof, said housing defining an air flow path including a compressed air inlet in communication with said compressor at one end thereof, said air flow path extending from said compressed air inlet substantially entirely about said inner, outer and radially extending walls of said annular combustor;

means for injecting fuel from a source into said annular combustor, said fuel injecting means including control means integrally associated therewith for injecting fuel at an optimum flow rate and pressure, said control means being directly responsive to instantaneous operating conditions; and means for bleeding compressed air from said air flow path in a substantially uniform manner, said compressed air bleeding means including valve means integrally associated therewith for bleeding compressed air at a variable rate from an intermediate point along said air flow path, said valve means being directly responsive to instantaneous operating conditions;

said compressed air bleeding means comprising a bleed manifold in fluid communication with said air flow path through said housing, said bleed manifold being in fluid communication with said air flow path through said housing directly opposite said radially extending wall at a point axially remote from said nozzle, said bleed manifold being in fluid communication with said air flow path through a plurality of uniformly circumferentially spaced holes in said housing.

8. The turbine engine of claim 7 wherein said compressed air bleeding means includes a duct leading from said bleed manifold for delivering compressed air to a remote location.

9. The turbine engine of claim 8 wherein said valve means is integrally associated with said duct downstream of said bleed manifold for bleeding compressed air at a variable rate.

10. The turbine engine of claim 7 including a controller operatively associated with said valve means for adjusting said valve means responsive to instantaneous operating conditions.

11. The turbine engine of claim 10 wherein said controller includes means for substantially opening said valve means in high altitude, low speed starting conditions during ignition.

12. The turbine engine of claim 10 wherein said controller includes means for entirely closing said valve means in high altitude, starting conditions after ignition.

13. The turbine engine of claim 10 wherein said controller includes means for opening said valve means during normal high altitude, full speed conditions when bleed air is required at a remote location.

14. A radial turbine engine, comprising:

a turbine wheel coupled to a rotary compressor for axially driven movement thereof;

an annular nozzle for directing gases of combustion radially at said turbine wheel;

an annular combustor defining an annular combustion space disposed about said turbine wheel and in fluid communication with both said compressor and said nozzle, said annular combustor receiving fuel from a source and air from said compressor and combusting fuel and air in said combustion space to generate said gases of combustion, said annular combustor being defined by an annular outer wall, an inner wall, and a radial wall extending between said inner and outer walls axially opposite said nozzle;

a housing substantially surrounding said annular combustor in spaced relation to said inner, outer and radially extending walls thereof, said housing defining an air flow path including a compressed air inlet in communication with said compressor at one end thereof, said air flow path extending from said compressed air inlet substantially entirely about said inner, outer and radially extending walls of said annular combustor;

means for injecting fuel from a source into said annular combustor, said fuel injecting means including control means integrally associated therewith for injecting fuel at an optimum flow rate and pressure, said control means being directly responsive to instantaneous operating conditions; and means for bleeding compressed air from said air flow path in a substantially uniform manner, said compressed air bleeding means including valve means integrally associated therewith for bleeding compressed air at a variable rate from an intermediate point along said air flow path, said valve means being directly responsive to instantaneous operating conditions;

said compressed air bleeding means comprising a bleed manifold in fluid communication with said air flow path through said housing, said bleed manifold being in fluid communication with said air flow path through said housing directly opposite said radially extending wall at a point axially remote from said nozzle, said bleed manifold being in fluid communication with said air flow path through a plurality of uniformly circumferentially spaced holes in said housing;

said compressed air bleeding means also including a duct leading from said bleed manifold for delivering compressed air to a remote location and a controller operatively associated with said valve means for adjusting said valve means responsive to instantaneous operating conditions.

15. The turbine engine of claim 14 wherein said valve means is integrally associated with said duct downstream of said bleed manifold for bleeding compressed air at a variable rate.

16. The turbine engine of claim 14 wherein said controller includes means for substantially opening said valve means in high altitude, low speed starting conditions during ignition.

17. The turbine engine of claim 14 wherein said controller includes means for entirely closing said valve means in high altitude, starting conditions after ignition.

18. The turbine engine of claim 14 wherein said controller includes means for opening said valve means during normal high altitude, full speed conditions when bleed air is required at a remote location.

* * * * *